US012590665B2

(12) United States Patent
Barnes

(10) Patent No.: US 12,590,665 B2
(45) Date of Patent: Mar. 31, 2026

(54) MONITORING OF LINED PIPELINE

(71) Applicant: Pioneer Lining Technology Limited, Glasgow (GB)

(72) Inventor: Stephen Barnes, Clydebank (GB)

(73) Assignee: PIONEER LINING TECHNOLOGY LIMITED, Glasgow (GB)

( * ) Notice: Subject to any disclaimer, the term of this patent is extended or adjusted under 35 U.S.C. 154(b) by 0 days.

(21) Appl. No.: 18/541,473

(22) Filed: Dec. 15, 2023

(65) Prior Publication Data

US 2024/0117916 A1 Apr. 11, 2024

Related U.S. Application Data

(62) Division of application No. 17/901,755, filed on Sep. 1, 2022, now abandoned, which is a division of
(Continued)

(30) Foreign Application Priority Data

Oct. 16, 2015 (GB) ...................................... 1518386
Oct. 13, 2016 (GB) ...................................... 1617400

(51) Int. Cl.
*F16L 58/10* (2006.01)
*B29C 63/34* (2006.01)
(Continued)

(52) U.S. Cl.
CPC .......... *F16L 58/1036* (2013.01); *B29C 63/34* (2013.01); *B29C 65/34* (2013.01);
(Continued)

(58) Field of Classification Search
CPC . F16L 1/18; F16L 1/19; F16L 13/0263; F16L 2201/30; F16L 25/01; F16L 47/03;
(Continued)

(56) References Cited

U.S. PATENT DOCUMENTS 5,072,622 A 12/1991 Roach et al.
5,177,468 A 1/1993 Baldwin et al.
(Continued)

FOREIGN PATENT DOCUMENTS

AT 137689 8/1990
AU 2012101045 8/2012
(Continued)

*Primary Examiner* — James D Sells
(74) *Attorney, Agent, or Firm* — MATTINGLY & MALUR, PC

(57) ABSTRACT

An integrity monitoring system for a lined pipeline is provided for monitoring the integrity of a polymer liner in a host pipe. Methods and apparatus are described by which a lined pipeline is provided with such an integrity monitoring system. Sensor cable is able to bridge a joint between sections of lined pipe, for example by routing the sensor cable across the joint via a channel in an electrofusion fitting or by connecting successive lengths of sensor cable via pass-throughs in an electrofusion fitting. Advantageously, the sensor cable is disposed within a continuous annulus between linings and host pipes, and the continuous annulus is maintained across pipe joints using electrofusion fittings.

15 Claims, 6 Drawing Sheets

Related U.S. Application Data application No. 15/768,553, filed as application No. PCT/GB2016/053213 on Oct. 17, 2016, now Pat. No. 11,454,346.

(51) Int. Cl.

| | |
|---|---|
| *B29C 65/00* | (2006.01) |
| *B29C 65/34* | (2006.01) |
| *F16L 1/18* | (2006.01) |
| *F16L 1/19* | (2006.01) |
| *F16L 13/02* | (2006.01) |
| *F16L 25/01* | (2006.01) |
| *F16L 47/03* | (2006.01) |
| *F16L 58/18* | (2006.01) |
| *F16L 59/14* | (2006.01) |
| *F16L 59/20* | (2006.01) |
| *F17D 5/02* | (2006.01) |
| *F17D 5/04* | (2006.01) |
| *G01M 3/02* | (2006.01) |
| *G01M 3/18* | (2006.01) |
| *G01M 3/28* | (2006.01) |
| *G01M 3/38* | (2006.01) |
| *G01M 3/00* | (2006.01) |

(52) U.S. Cl.

CPC ............ *B29C 66/5221* (2013.01); *F16L 1/18* (2013.01); *F16L 1/19* (2013.01); *F16L 13/0263* (2013.01); *F16L 25/01* (2013.01); *F16L 47/03* (2013.01); *F16L 58/181* (2013.01); *F16L 59/143* (2013.01); *F16L 59/20* (2013.01); *F17D 5/02* (2013.01); *F17D 5/04* (2013.01); *G01M 3/02* (2013.01); *G01M 3/18* (2013.01); *G01M 3/185* (2013.01); *G01M 3/283* (2013.01); *G01M 3/38* (2013.01); *F16L 2201/30* (2013.01); *G01M 3/002* (2013.01)

(58) Field of Classification Search

CPC ... F16L 58/181; F16L 58/1036; F16L 59/143; F16L 59/20; F17D 5/02; F17D 5/04; G01M 3/002; G01M 3/02; G01M 3/165; G01M 3/18; G01M 3/185; G01M 3/283; G01M 3/38; B29C 63/34; B29C 65/34; B29C 65/342; B29C 66/301; B29C 66/5221

USPC ...... 156/47, 49, 51, 52, 60, 64, 70, 71, 157, 156/158, 182, 196, 198, 199, 293, 294, 156/296, 297, 298, 304.1, 304.2, 304.3, 156/303.1, 160, 307.1, 307.3, 307.7, 156/308.2, 309.6; 138/97, 98, 111, 112, 138/114, 140, 141, 104

See application file for complete search history.

(56) References Cited

U.S. PATENT DOCUMENTS

| | | | | |
|---|---|---|---|---|
| 5,551,484 | A | 9/1996 | Charboneau | |
| 5,778,938 | A | 7/1998 | Chick et al. | |
| 5,935,376 | A | 8/1999 | Fell | |
| 5,971,029 | A | 10/1999 | Smith et al. | |
| 6,428,054 | B1 * | 8/2002 | Zappa ................. | B29C 66/5221 |
| | | | | 285/133.11 |
| 6,935,376 | B1 | 8/2005 | Taylor et al. | |
| 7,614,661 | B1 | 11/2009 | Ruffle et al. | |
| 2012/0255664 | A1 | 10/2012 | Lindner et al. | |
| 2013/0061971 | A1 | 3/2013 | Chamberland | |
| 2013/0114945 | A1 | 5/2013 | Pionetti et al. | |
| 2013/0284296 | A1 | 10/2013 | Berger et al. | |

FOREIGN PATENT DOCUMENTS

| | | | | | |
|---|---|---|---|---|---|
| CH | | 631003 | A | 7/1982 | |
| DE | | 2943328 | A * | 5/1981 | ............. F16L 59/00 |
| DE | | 3503391 | | 8/1986 | |
| DE | | 3503391 | A1 * | 8/1986 | |
| EP | | 0 580 903 | | 2/1994 | |
| EP | | 0 722 824 | | 7/1996 | |
| FR | | 2 963 654 | | 2/2012 | |
| GB | | 2 296 568 | | 7/1996 | |
| JP | | 9-170961 | | 6/1997 | |
| WO | WO | 99446529 | | 9/1999 | |
| WO | WO | 2004/011840 | | 2/2004 | |
| WO | WO | 2010/041016 | | 4/2010 | |

* cited by examiner

MONITORING OF LINED PIPELINE

The present invention relates to monitoring of lined pipeline, and in particular monitoring the integrity of a polymer liner in a host pipe. More specifically, the present invention concerns improvements to methods of providing a monitoring system in a lined pipeline formed of sections of lined pipe that results in improved detection of leaks and/or other characteristics and parameters, and thereby increases the safety, integrity and reliability of the resulting lined pipeline in service.

BACKGROUND TO THE INVENTION

The life and performance of new and existing pipelines can be extended and optimised by lining lengths of metal pipe with polymer liners. Prior to their insertion in a host pipe, polymer liner pipes have a larger outer diameter than the inner diameter of the host pipe into which they are being inserted. The liner pipes are temporarily reduced in diameter immediately prior to insertion, for example by pulling them through the host pipe via a reduction die. After the insertion of the liner pipe is completed, the pulling tension is released and the liner pipe is allowed to revert towards its original size so as to provide a tight fitting liner inside the host pipe in a process termed reversion.

Polymer lining may thus be used to provide corrosion protection to the inside of a carbon steel pipeline by serving as a barrier between a corrosive product being transported and the carbon steel pipe itself. In the event that the corrosion barrier, i.e. the polymer lining, was compromised the rate of corrosion in an un-protected carbon steel pipeline could be rapid.

Pipelines have been known to fail due to excessive rates of corrosion that remained undetected until the pipe wall could no longer contain the operating pressures and leakage occurred. The condition is well known and a proven risk in pipelines operating for extended service lives in corrosive environments—for example in water injection flowlines which may be used to transport seawater or produced water to an injection well.

While lining such pipelines with polymer liners can be used to provide corrosion protection as noted above, currently there are no known methods of inspecting a polymer lined pipeline to monitor corrosion rates or to give early warning of potential leaks. This is particularly desirable in subsea applications. While Saturated Low Frequency Eddy Current (SLOFEC) techniques provide a means to "see" through steel and polymer, the technology would require pigging along very long lengths of lined pipe, and to date this has not proven possible to achieve. So-called smart inspection pigs or in-line inspection tools may used magnetic flux leakage to assess the integrity of the metal pipeline but would be ineffective with respect to the polymer liner.

Furthermore, any pigging arrangement requires the pipeline to be shut down and the provision of a launching station at one end (for insertion of the pig) and a receiving station at the other end (to receive the pig at the end of its travel through the pipeline). It is therefore impossible to employ pigging techniques to monitor a pipeline in real-time, or indeed along the entire length (at discrete locations or otherwise) of the pipeline simultaneously.

United States Patent Application Publication Number US20130284296 describes a pipe with a two-layer coating, one of which is electrically conductive and/or optically contrasting such that when an outer covering is damaged an electrical signal and/or a visual change can be detected.

However, this is only applicable to external coverings and therefore cannot provide any information regarding internal linings nor details of the locations of any damage other than by visual inspection.

US20130061971 describes a protective liner with wear detection which is similar to the external coating shown in US20130284296. A non-conductive layer is located between the pipe and an inner conductive layer, and a monitoring device monitors for an electrical connection between the pipe and the inner conductive layer which may be indicative of wear or damage.

JP9170961A2 provides an electric wire for detecting liquid leakage in which expansion of an inner layer (by contact with a liquid to which it reacts) causes an inner conductor to make contact with an inner conductor and establish an electrical connection. While it is suggested the wire may be employed to monitor piping systems, it is intended to be placed next to such systems to detect leaks and therefore could not provide early warning or other information relating to the internal conditions of a pipeline, lined or otherwise.

U.S. Pat. No. 5,177,468 discloses a conduit liner monitor in which a wire is disposed within the liner and the continuity of the wire is monitored—if the wire is broken this indicates a potential problem with the liner. This arrangement would not provide information about the pipeline itself, detailed information about the problem which led to the break, or indeed continue to work after the initial fault occurs.

U.S. Pat. No. 6,935,376 and EP0580903 each disclose a lined pipeline provided with an integrity monitoring system, and U.S. Pat. Nos. 5,935,376, 5,778,938 and 5,971,029 also disclose methods of producing a lined pipeline with an integrity monitoring system. However, the Applicant has identified that none of these documents teach the skilled person how to join sections of lined pipe in a way which enables monitoring of a resulting, joined pipeline.

Accordingly, in light of the prior art's failure to address one or more problems identified by the Applicant, it is an object of at least one aspect of the present invention to enable monitoring the integrity of a lined pipeline formed of a plurality of sections of lined pipe, and in particular monitoring the integrity of a polymer liner and/or the host pipe of such a lined pipeline.

It is also an object of at least one aspect of the present invention to provide apparatus which facilitates providing a monitoring system in such a lined pipeline that results in improved detection of leaks and/or other characteristics and parameters, and thereby increases the safety, integrity and reliability of the resulting lined pipeline in service.

Embodiments of aspects of the present invention are intended to increase the safety, integrity and reliability of such lined pipelines in service, and to obviate or mitigate one or more further disadvantages of existing methods and apparatus.

Further aims and objects of aspects and embodiments of the invention will become apparent from reading the following description.

SUMMARY OF THE INVENTION

According to a first aspect of the invention, there is provided a method of producing a lined pipeline with an integrity monitoring system, the method comprising pulling a pipe lining through a host pipe to be lined via apparatus which temporarily reduces the external diameter of the pipe lining and locating a sensor cable between the pipe lining and the host pipe prior to releasing pulling tension on the pipe lining.

Preferably, the apparatus comprises one or more dies. Alternatively, or additionally, the apparatus may comprise one or more rollers.

Preferably, pulling the pipe lining through the host pipe and locating the sensor cable between the pipe lining and the host pipe are performed simultaneously. Optionally, the method comprises attaching a first end of the sensor cable to a distal end of the pipe lining prior to pulling the pipe lining through the host pipe.

Preferably, the sensor cable comprises a plurality of sensors wherein the sensor cable provides a means to communicate signals or data from the plurality of sensors. Alternatively, or additionally, the sensor cable provides a means to communicate signals or data from one or more sensors not comprised in the sensor cable.

Optionally, the method comprises locating a plurality of sensor cables between the pipe lining and the host pipe. Optionally, the one or more sensor cables may be distributed circumferentially around the pipe lining. Optionally, the one or more sensor cables may be disposed along the pipe lining in a helical manner.

Optionally, the method comprises providing an insulatory sleeve between the pipe lining and the host pipe. Preferably, the insulatory sleeve is inserted between the pipe lining and the host pipe prior to releasing pulling tension on the pipe lining. Optionally, the insulatory sleeve extends beyond the end of the pipe lining.

The sensors may comprise seawater sensors. The sensor cable may comprise electrical wiring. Alternatively, or additionally, the sensors may comprise sensors selected from the group comprising temperature sensors, gas sensors, liquid sensors, pressure sensors and light sensors. Alternatively, or additionally, the sensor cable may comprise one or more optical fibres.

Optionally, one or more sensors are provided in an electrofusion fitting to which one end of the pipe lining is welded.

Preferably, the method further comprises providing a monitoring apparatus to receive signals and/or data via the sensor cable and process the signals and/or data. The monitoring apparatus may be external to the lined pipeline. The monitoring apparatus may be adapted or configured to generate one or more alarms corresponding to one or more received signals and/or data.

Optionally, the method further comprises progressively flooding the lined pipeline to displace air pockets in the annulus between the pipe lining and the host pipe.

Embodiments of the first aspect of the invention may comprise features corresponding to any essential, preferred or optional features of any other aspect of the invention or vice versa.

According to a second aspect of the invention, there is provided a method of providing a lined pipeline with an integrity monitoring system, the method comprising locating a sensor cable in a continuous annulus between the pipe lining and the host pipe.

Preferably, the sensor cable comprises a plurality of sensors wherein the sensor cable provides a means to communicate signals or data from the plurality of sensors. Alternatively, or additionally, the sensor cable provides a means to communicate signals or data from one or more sensors not comprised in the sensor cable.

Embodiments of the second aspect of the invention may comprise features corresponding to any essential, preferred or optional features of any other aspect of the invention or vice versa.

According to a third aspect of the invention, there is provided a lined pipeline comprising an integrity monitoring system, wherein the integrity monitoring system comprises a sensor cable disposed between a host pipe and a pipe lining of the lined pipeline.

Preferably, the sensor cable is disposed in a continuous annulus between the host pipe and the pipe lining.

The sensor cable may be disposed between the host pipe and the pipe lining using a method according to the first aspect or the second aspect.

Optionally, the integrity monitoring system further comprises a monitoring apparatus configured or arranged to receive and process data and/or signals from one or more sensors comprised in the sensor cable and/or communicated by the sensor cable.

Embodiments of the third aspect of the invention may comprise features corresponding to any essential, preferred or optional features of any other aspect of the invention or vice versa.

According to a fourth aspect of the invention, there is provided a lined pipeline integrity monitoring system comprising a sensor cable adapted and/or configured for location between a host pipe and a pipe lining of a lined pipeline.

Preferably, the sensor cable comprises a plurality of sensors wherein the sensor cable provides a means to communicate signals or data from the plurality of sensors. Alternatively, or additionally, the sensor cable provides a means to communicate signals or data from one or more sensors not comprised in the sensor cable.

Preferably, the monitoring system comprises a monitoring apparatus configured or arranged to receive and process data and/or signals from one or more sensors comprised in the sensor cable and/or communicated by the sensor cable.

Embodiments of the fourth aspect of the invention may comprise features corresponding to any essential, preferred or optional features of any other aspect of the invention or vice versa.

According to a fifth aspect of the invention, there is provided a method of monitoring the integrity of a lined pipeline comprising providing the lined pipeline with an integrity monitoring system in accordance with the first or second aspect, and monitoring data and/or signals from one or more sensors comprised in the sensor cable and/or communicated by the sensor cable disposed between the host pipe and the pipe lining of the lined pipeline.

Most preferably, the method comprises determining the presence of one or more faults and generating one or more corresponding alarms. This may be performed by a monitoring apparatus of the monitoring system which receives and processes signals and/or data from one or more sensors disposed between the host pipe and the pipe lining of the lined pipeline.

Preferably, the method further comprises correlating signals and/or data corresponding to the one or more faults with information relating to the location of one or more sensors from which the signals and/or data originate to determine a location of the one or more faults.

Optionally, or alternatively, the method comprises monitoring one or more temperatures associated with the lined pipeline. The one or more temperatures may be monitored using sensors comprised in a sensor cable and/or sensors which communicate data and/or signals via the sensor cable. Optionally, or alternatively, the method comprises monitoring for the presence of gas and/or liquid within the annulus. Optionally, or alternatively, the method comprises monitoring pressure within the annulus. Optionally, or alternatively, the method comprises detecting light within the annulus.

Embodiments of the fifth aspect of the invention may comprise features corresponding to any essential, preferred or optional features of any other aspect of the invention or vice versa.

According to a sixth aspect of the invention there is provided a lined pipeline comprising a plurality of lined pipe sections, each lined pipe section comprising a host pipe, a pipe lining disposed within the host pipe, and a sensor cable disposed in a continuous annulus between the host pipe and the pipe lining.

Preferably, the sensor cable is connectable to a monitoring apparatus to provide a monitoring system.

Optionally, the lined pipeline further comprises a plurality of electrofusion fittings which join the pipe linings of the lined pipe sections together. Preferably, the electrofusion fittings comprise pass throughs which permit communication of data and/or signals via the electrofusion fitting.

Preferably, the sensor cable comprises a plurality of sensors distributed along the sensor cable. Alternatively, or additionally, the sensor cable provides a means of communicating data and/or signals from one or more sensors disposed in the electrofusion fittings of the lined pipeline.

Embodiments of the sixth aspect of the invention may comprise features corresponding to any essential, preferred or optional features of any other aspect of the invention or vice versa.

According to a seventh aspect of the invention, there is provided an electrofusion fitting for a lined pipeline comprising a plurality of lined pipe sections and an integrity monitoring system, the electrofusion fitting comprising one or more sensors and one or more interfaces to communicate data and/or signals to one or more sensor cables connected to the electrofusion fitting.

Preferably, the one or more sensors are embedded in the electrofusion fitting. Preferably, one or more sensors are embedded in an insulating portion of the electrofusion fitting. Advantageously, one or more sensors, which may be seawater sensors, are located proximal to a location of a corresponding girth weld.

Optionally, the one or more sensor cables comprise a plurality of sensors.

Embodiments of the seventh aspect of the invention may comprise features corresponding to any essential, preferred or optional features of any other aspect of the invention or vice versa.

According to an eighth aspect of the invention, there is provided a method of laying lined pipeline, the method comprising joining a lining of a first lined pipe section to the lining of a second lined pipe section to preserve the continuity of an annulus along the length of the joined pipe sections, and joining a sensor cable of the first lined pipe section to a sensor cable of the second lined pipe section.

Most preferably, the linings may be joined using an electrofusion fitting. Additionally, the sensor cables may be joined via the electrofusion fitting. The electrofusion fitting may comprise a pass through to facilitate communication of data and/or signals from the sensor cable of the first lined pipe section to the sensor cable of the second lined pipe section.

Alternatively, the linings may be joined by performing a butt fusion weld.

Embodiments of the eighth aspect of the invention may comprise features corresponding to any essential, preferred or optional features of any other aspect of the invention or vice versa.

According to a ninth aspect of the invention, there is provided a method of producing a lined pipeline with an integrity monitoring system, comprising:

providing a first section of lined pipe with a first sensor cable disposed in a continuous annulus between a first host pipe and a first pipe lining;

providing a second section of lined pipe section with a second sensor cable disposed in a continuous annulus between a second host pipe and a second pipe lining; and joining the first pipe lining to the second pipe lining using an electrofusion fitting configured to enable the first sensor cable to communicate with the second sensor cable.

Preferably, the electrofusion fitting is further configured to maintain the continuous annulus between the first and second sections of lined pipe.

The method may comprise connecting the first sensor cable to a first end of a sensor cable disposed on or in the electrofusion fitting, and connecting the second sensor cable to a second end of the sensor cable disposed on or in the electrofusion fitting.

The electrofusion fitting may comprise a terminal at each end of the sensor cable disposed on or in the electrofusion fitting for attachment to the first and second sensor cables.

Alternatively, the method may comprise locating the first or second sensor cable in at least one channel extending from a position towards a first end of the electrofusion fitting to a position towards a second end of the electrofusion fitting.

The channel may be provided on a surface of the electrofusion fitting. Alternatively, the channel may extend at least partially through the body of the electrofusion fitting.

The method may comprise routing a sensor cable through a shoulder provided in the body of the electrofusion fitting. Alternatively, the method may comprise routing a sensor cable through a channel extending substantially through the body of the electrofusion fitting.

The method may comprise routing a sensor cable across, through or otherwise bridging the electrofusion fitting, and thereby enable the first and second sensor cables to be provided by a single continuous sensor cable. In other words, the sensor cable in both sections is the same cable which is routed across, through or otherwise bridges the electrofusion fitting.

Preferably, the method comprises routing or otherwise locating the sensor cable between the insulation and the main body of the electrofusion fitting.

Optionally, the electrofusion fitting comprises at least one sensor. The at least one sensor is preferably configured to communicate with one or both of the sensor cable disposed in the first section of lined pipe and the sensor cable disposed in the second section of lined pipe. The sensor cable disposed in the first section of lined pipe and the sensor cable disposed in the second section of lined pipe (which as above may be the same sensor cable) may optionally comprise at least one sensor.

Embodiments of the ninth aspect of the invention may comprise features corresponding to any essential, preferred or optional features of any other aspect of the invention or vice versa. In particular, providing a section of lined pipe with a sensor cable disposed in a continuous annulus between a host pipe and a pipe lining may be achieved by the method of the first aspect.

According to a tenth aspect of the invention, there is provided an electrofusion fitting for joining a first pipe lining of a first section of lined pipe to a second pipe lining of a second section of lined pipe, the electrofusion fitting being configured to enable a sensor cable disposed between the first pipe lining and a first host pipe in the first section of lined pipe to communicate with a sensor cable disposed between the second pipe lining and a second host pipe in the second section of lined pipe.

Optionally, the electrofusion fitting comprises at least one sensor cable extending from a position towards a first end of the electrofusion fitting to a position towards a second end of the electrofusion fitting. The at least one sensor cable may be connectable at the first end to the sensor cable in the first section of lined pipe, and at a second end to the sensor cable in the second section of lined pipe. The electrofusion fitting may comprise a terminal at each end of the sensor cable for attachment to the sensor cable in the first and second sections of lined pipe.

Alternatively, or additionally, the electrofusion fitting comprises at least one channel extending from a position towards a first end of the electrofusion fitting to a position towards a second end of the electrofusion fitting. The channel may be provided on a surface of the electrofusion fitting. Alternatively, the channel may extend at least partially through the body of the electrofusion fitting. The channel may comprise a bore through a shoulder provided in the body of the electrofusion fitting. Alternatively, the channel may extend substantially through the body of the electrofusion fitting.

The channel may enable a continuous sensor cable to be routed across, through or otherwise bridge the electrofusion fitting, and thereby provide both the sensor cable of the first section of lined pipe and the sensor cable of the second section of lined pipe. In other words, the sensor cable in both sections is the same cable which is routed across, through or otherwise bridges the electrofusion fitting.

Preferably, the electrofusion fitting further comprises insulation to protect the electrofusion fitting from heat damage. The insulation may also protect the sensor cable from heat damage. For example, the sensor cable may be routed or otherwise located between the insulation and the main body of the electrofusion fitting.

Optionally, the electrofusion fitting comprises at least one sensor. The at least one sensor is preferably configured to communicate with one or both of the sensor cable disposed in the first section of lined pipe and the sensor cable disposed in the second section of lined pipe. The sensor cable disposed in the first section of lined pipe and the sensor cable disposed in the second section of lined pipe (which as above may be the same sensor cable) may optionally comprise at least one sensor.

Embodiments of the tenth aspect of the invention may comprise features corresponding to any essential, preferred or optional features of any other aspect of the invention or vice versa.

According to other aspects of the invention, there is provided method of producing a lined pipeline with an integrity monitoring system, a method of providing a lined pipeline with an integrity monitoring system, a lined pipeline comprising an integrity monitoring system, a lined pipeline integrity monitoring system, a method of monitoring the integrity of a lined pipeline, a lined pipeline, an electrofusion fitting, and/or a method of laying lined pipeline, substantially as herein described with reference to the appended drawings.

BRIEF DESCRIPTION OF THE DRAWINGS

Aspects and advantages of the present invention will become apparent upon reading the following detailed description and upon reference to the following drawings (like reference numerals referring to like features) in which.

DETAILED DESCRIPTION OF PREFERRED EMBODIMENTS

As discussed in the background to the invention above, it is not presently possible to consistently and effectively monitor the integrity of a lined pipeline in the field, and particularly not when in service. An embodiment of the present invention is now described which provides a lined pipeline, and particularly a lined pipeline formed from sections of lined pipe which are joined together, with a monitoring system which enables real-time integrity monitoring which increases confidence in the resulting lined pipeline when in service.

As explained in the background to the invention, the life and performance of new and existing pipelines can be extended and optimised by lining lengths of metal pipe with polymer liners. Techniques such as the Applicant's Swagelining® pipe lining service allows existing pipelines to be remediated and new pipelines to be provided with corrosion resistance by installing a polymer liner that remains in tight contact with the inside of a host pipe.

Figure 1:
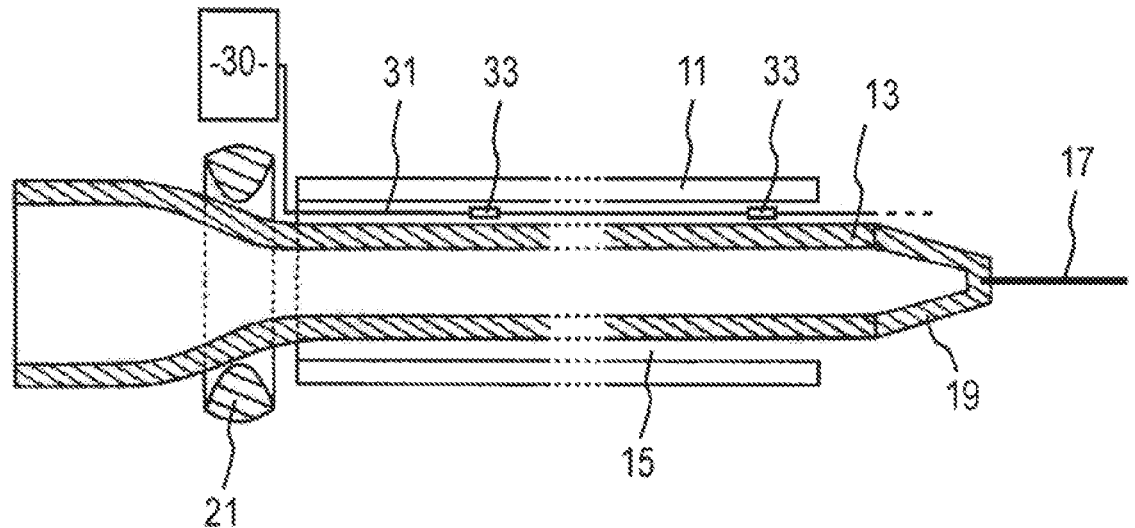
FIG. 1 is a longitudinal cross-sectional view illustrating an intermediate stage in a pipe lining process in which a host pipe is being lined with a liner pipe, the liner pipe having been drawn through a swaging die to reduce its outer diameter, and co-insertion of a sensor cable (with associated sensors) between the liner pipe and the host pipe, in accordance with an aspect of the invention.

FIG. 1 illustrates a host pipe 11 being lined with pipe lining comprising a polymer liner pipe 13. The liner pipe 13 is pulled through a swaging die 21 to reduce the outer diameter of the liner pipe 13 before being pulled through the pipe 11. The liner pipe 13 is pulled by a winch (not shown)

and cable 17; the cable 17 attached to a pulling cone 19 welded to the end of the liner pipe 13. Subsequent release of the liner pipe 13, for example by removing the pulling tension provided by the winch, will allow the liner pipe 13 to expand into tight engagement with the host pipe 11 by virtue of the reversion process discussed in the background to the invention above.

Simultaneously as the liner pipe 13 is pulled through the pipe 11, a sensor cable 31 is also pulled or fed through the pipe 11 in the annular space 15 between the reduced diameter liner pipe 13 and the pipe 11. Accordingly, when pulling tension on the liner pipe 13 is released and the liner pipe 13 is allowed to undergo reversion, not only does the liner pipe 13 revert to provide the host pipe 11 with the required corrosion barrier but also serves to retain the sensor cable 31 in place within the annular space 15. The sensor cable 31 may be fed from or pulled out of (or otherwise dispensed from) a cable dispenser indicated by reference numeral 30.

Of course, rather than pulling or feeding (or otherwise locating) the sensor cable 31 through the pipe 11 simultaneously with the liner pipe 13, the sensor cable 31 can be pulled or fed (or otherwise located) through the pipe 11 in the annular space prior to lining, then lining performed. Alternatively, locating the sensor cable through the pipe could be done subsequently; provided it is carried out before the liner pipe 13 undergoes reversion (although it is envisaged that it may be possible to do so while the liner pipe 13 is undergoing reversion).

In this embodiment the sensor cable 31 comprises a number of sensors 33 disposed along its length; the sensors 33 capable of measuring one or more parameters of the resulting pipeline, and the cable 31 itself providing a means to transmit the measured parameters from the sensors 33. For example, transmission of the measured parameters may be to a monitoring apparatus (not shown) which is external to the lined pipe.

It is a particular advantage that lining of pipelines in this manner provides a continuous annulus along the length thereof, within which the sensor cable 31 is located, as will become apparent from the following description.

Note that the sensor cable 31 may comprise a simple arrangement such as a series of seawater sensors connected by electrical wiring, which is the case in the present embodiment. Detection of seawater results in a corresponding signal being communicated along the sensor cable to a monitoring apparatus which can then alert the pipeline operator of the existence of a problem—a problem which can be traced back to the sensor and hence to the particular location at which seawater was detected. Crucially, this alerts the operator before corrosion rates become a problem and maximises the time (which may be several years as this arrangement permits early detection) to develop an action plan to avoid emergencies such as loss of production or environmental damage caused by leakage.

Alternatively, or additionally of course, the sensor cable may be a more complex arrangement, for example comprising a fibre optic cable which facilitates the measurement of a number of different parameters such as temperature along the length thereof, the presence of gas (or other fluid) between the liner pipe 13 and the host pipe 11, and other diagnostic information. Monitoring the operating temperature along the length of the lined pipeline may be of particular benefit in hydrocarbon transport as shut downs lead to temperature drops which can result in the formation of hydrates that will hamper restart of the flowline. Real-time measurements along the length of the flowline can identify where this is a risk and allow an operator to take appropriate action.

These advantages may also be achieved, and/or the utility of the present invention enjoyed, by employing a variety of different sensors along the sensor cable 31, such as temperature sensors, gas sensors, liquid sensors, pressure sensors and even light sensors, any and each of which can communicate diagnostic information along the sensor cable 31 to a monitoring apparatus. As noted above, the monitoring apparatus can correlate the diagnostic information with the location of the corresponding sensors to provide real-time monitoring of various pipeline parameters along the entire length of the lined pipeline.

It is envisaged that insulation may be provided between the liner and the host pipe, in which case the sensor cable may be located either between the insulation and the liner or between the insulation and the host pipe, or indeed sensor cable could be disposed in each location. Again, the provision of continuous annuli permits the sensor cable or cables to extend the entire length of the pipeline.

Insulation may be provided by way of a discrete sleeve disposed between the liner and the host pipe, inserted for example during the lining process. This may be particularly effective near the ends of sections of lined pipe where the end of the liner may be set back from the end of the pipe to accommodate an electrofusion fitting (such as the examples described in further detail below). The insulatory sleeve may protect sensor cable in the vicinity of the interface between the liner and the fitting—for example before it is passed under or through insulation provided in or on the fitting itself, or before it is connected to terminals of a pass-through provided on or in the fitting—from heat damage due to the girth weld between the pipes.

Terminals (not shown) may be provided at either end of the lined pipeline at which corresponding ends of the sensor cable 31 can terminate. At one end, such a terminal (or terminals) may provide a means for electrical connection or other communication to the monitoring apparatus. At the other end, such a terminal may provide a means for electrical connection to, say, an electrofusion fitting such as described in further detail below. In fact, connection of a sensor cable to the distal end of the liner pipe before it is pulled through the host pipe will allow the sensor cable to be pulled through the host pipe at the same time.

Furthermore, it should be noted that while the described embodiment disposes a single sensor cable 31 and corresponding single set of sensors 33 in the annulus, it will be understood that additional sensor cables may be pulled or fed through the pipe 11 in the annular space 15 at the same time. In this way, not only will sensors be distributed along the length of the lined pipe but also distributed circumferentially. It is also envisaged that one or more sensor cables may be disposed along the length of the lined pipe in a helical manner—one way in which this might be achieved is to attach one end of the sensor cable or cables to the distal end of the liner pipe before it is pulled through the host pipe and rotating a corresponding cable dispenser or guide around the liner simultaneously as the liner is pulled through the pipe.

Figure 2:
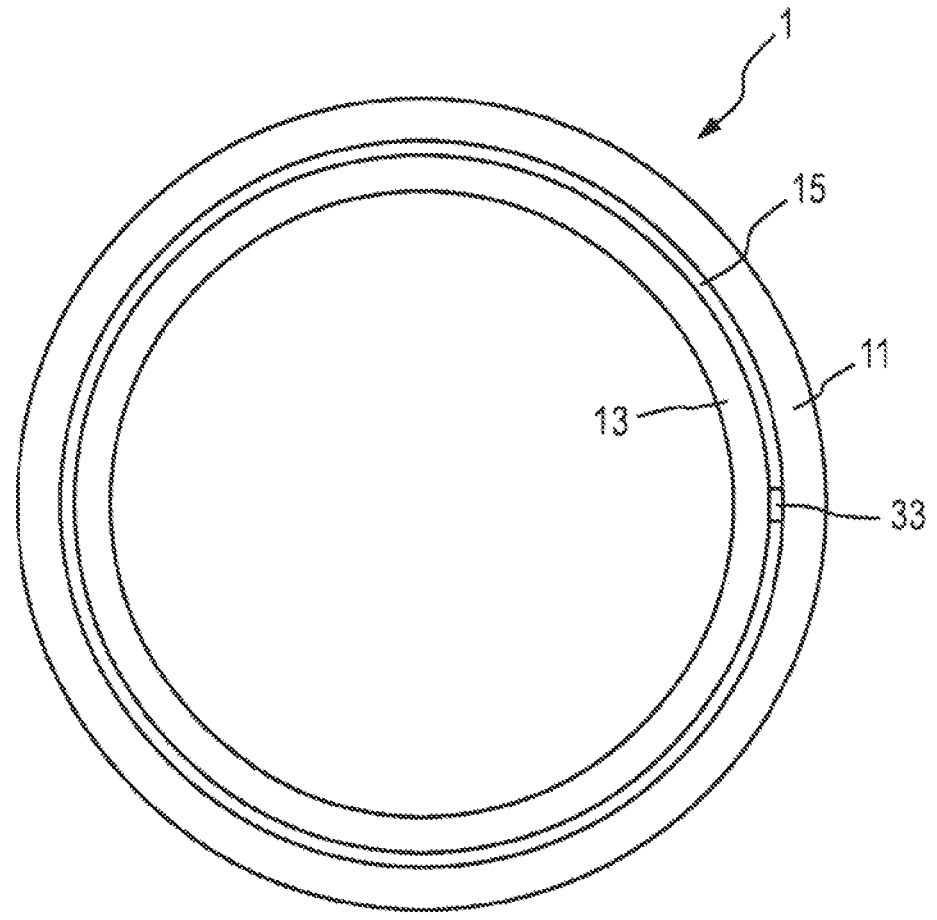
FIG. 2 is a lateral cross-sectional view illustrating a polymer lined pipeline produced using a method such as illustrated in FIG. 1, showing a sensor disposed between the liner pipe and the host pipe, in accordance with an aspect of the invention.

FIG. 2 is a schematic lateral cross-section through the lined pipeline 1, resulting from the exemplary lining process described with reference to FIG. 1 above, which shows the annulus 15 between the host pipe 11 and the liner 13 of the pipeline 1 after reversion of the liner pipe 13. In reality, any physical separation between the pipe 11 and the liner 13 in the annulus 15 is microscopic, but the annulus 15 is exaggerated figuratively here for the purposes of illustration. During the process by which the liner 13 is installed in the host pipe 11 described above, the sensor cable has been simultaneously located in the annulus 15 and FIG. 2 also shows a sensor 33 of the sensor cable which has been retained in the annulus 15 and held in position by the radial expansion of the liner 13 against the host pipe 11.

Figure 3:
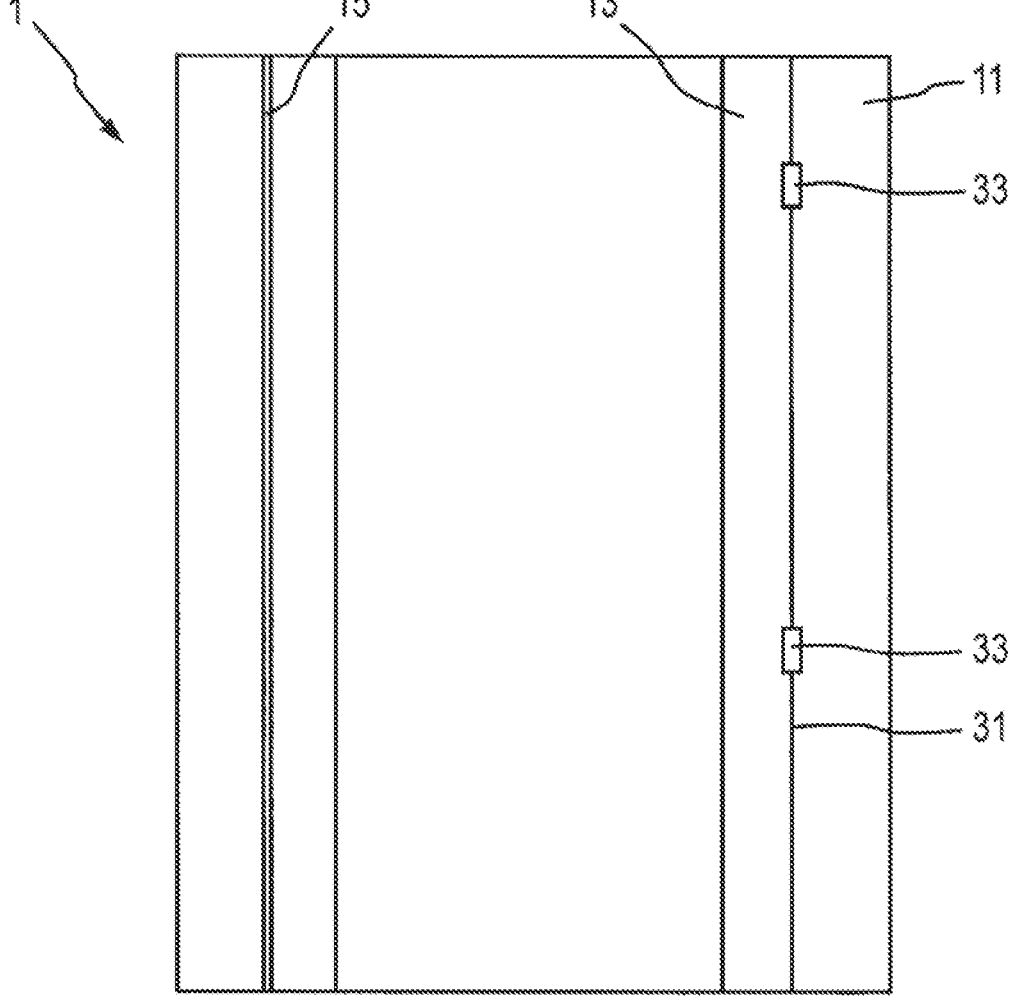
FIG. 3 is a longitudinal cross-sectional view of the polymer lined pipeline shown in FIG. 2 showing the sensor cable (and associated sensors) disposed between the liner pipe and the host pipe, in accordance with an aspect of the invention.

This is illustrated, again in exaggerated form, in a schematic longitudinal cross-section through a portion of lined pipeline 1 shown in FIG. 3. Within the annulus 15 between the host pipe 11 and liner 13 of the pipeline 1 are shown sensors 33 and the corresponding sensor cable 31 which have been retained in the annulus 15 and held in position by the radial expansion of the liner 13 against the host pipe 11. It will be apparent that an advantage of this technique of locating sensors within a lined pipeline is that the location of a particular sensor can not only be well controlled in the process of lining the pipe itself, but this positional information remains reliable when the lined pipeline is in service because the liner holds the sensor in place. This arrangement also provides inherent protection to the sensors as well as the sensor cable (or cables).

As noted above, while the invention has been exemplified by the deployment of seawater sensors within the continuous annulus, any kind of sensor which can monitor or provide information relating to conditions, characteristics or parameters within or near the annular space can be employed.

For example, during the reversion process, the varying geometry of the inner diameter of the host pipe and the influence of any internal weld bead protrusions, surface irregularities and the like, may interfere with the reversion process, causing it to be uneven. In these circumstances, it is possible that air pockets may be trapped in the annular space between the outer surface of the liner pipe and the inner surface of the host pipe. This may be considered to present a potential operational risk that the liner pipe may collapse during operation of, say, a flowline which comprises lined pipeline. Sensors may therefore be provided, in accordance with the invention, to identify the presence of air pockets or indeed any gas or fluid presence in the annular space.

The use of any number, type and/or combination of sensors appropriate to the monitoring of conditions, characteristics or parameters within or near the annular space should therefore be considered within the scope of the invention described and defined herein.

In a pipeline installation such as an s-lay pipeline installation or j-lay pipeline installation, a pipeline may be constructed length-by-length in which case adjacent sections of pipe are welded end-to-end on board and fed out from a pipe lay vessel. In a similar manner, lined pipeline of indefinite length can be constructed by joining sections of lined pipe.

Provided the lined pipe sections which are joined length by length are joined in such a manner as to preserve the continuity of the annulus between the host pipe and the pipe lining across the join, the inventive method will continue to permit the disposal of sensor cables and sensors along the entire length of the lined pipeline.

The Applicant's earlier International Application Publication Number WO 2010/041016 discloses an electrofusion fitting and a method of forming a pipe joint between two lined metal pipe lengths incorporating such a fitting. Such a method can be employed to manufacture significant lengths of lined pipeline by joining together several lined metal pipe lengths using such electrofusion fittings either in a length-by-length manner on an s-lay or j-lay barge, or onshore in which case lined pipeline can be spooled onto a reel for installation by a reel lay vessel or alternatively towed to the installation location. In any case, the electrofusion fitting and the corresponding methods permit the continuity of the annulus to be preserved across joins between lined pipe lengths.

It is envisaged that the invention may be supported or enhanced by a modified electrofusion fitting, corresponding to the Applicant's above-mentioned electrofusion fitting or indeed any other fitting which permits the forming of a pipe joint between two lined metal pipe lengths, which permits communication across the pipe joint. Although it is envisaged that the sensors and any fibres, conduits and/or circuitry etc. may be disposed within the annulus across the fitting, it is advantageous if the electrofusion fitting comprises one or more pass throughs to connect fibres, conduits and/or circuitry etc. disposed within one lined pipe length to corresponding fibres, conduits and/or circuitry etc. disposed within another lined pipe length to which it is joined (using the electrofusion fitting). One or more terminals may be provided at or near the ends of the electrofusion fitting to permit such connections to be made.

The electrofusion fitting itself may also be provided with one or more sensors, for example to detect seawater ingress behind the fitting itself which might be indicative of a failure of the electrofusion welds of the fitting, liner compromise in the vicinity of the fitting (that might, for example, not be detected by other sensors in the annulus), or indeed failure or compromise of the girth weld between the metal host pipes. The sensors may be provided within an insulating layer of the electrofusion fitting to reduce the risk of damage from heat during creation of said girth weld. The sensors may be in communication with the sensor cables and/or other sensors in the annulus of the connected lined pipes, for example via pass throughs in the fitting itself (as described above and below) or directly.

Figure 4:
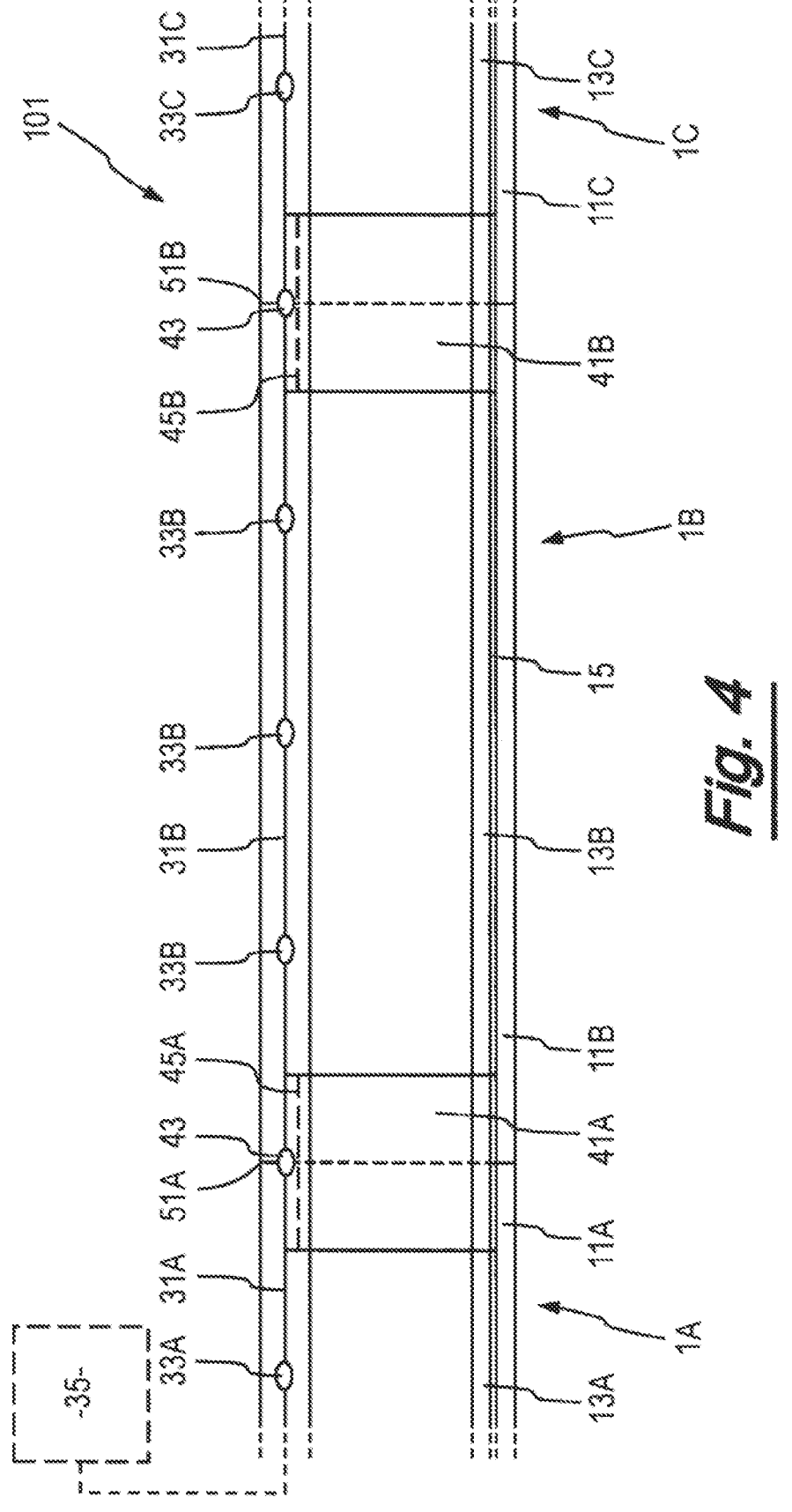
FIG. 4 is a longitudinal cross-sectional schematic view of a portion of a polymer lined pipeline according to an aspect of the invention, formed by joining several lined pipe sections using electrofusion fittings according to another aspect of the invention.

FIG. 4 illustrates in schematic form a portion of a polymer lined pipeline which has been constructed by joining, length-by-length, a number of lined pipe sections 1A, 1B, 1C using electrofusion fittings 45A, 45B to join respective linings 13A, 13B, 13C and girth welds 51A, 51B to join respective metal pipes 11A, 11B, 11C, in accordance with some of the concepts described above. A monitoring apparatus 35 is also provided which receives data and/or signals etc. from sensors disposed within the lined pipeline (as described above and below) and can provide the pipeline operator with displays of such information, generate alarms and/or otherwise identify and communicate the presence of defects or faults.

Within each lined pipe section 1A, 1B, 1C, there is disposed a length of sensor cable 31A, 31B, 31C and a corresponding set of sensors 33A, 33B, 33C located within the annulus 15 which is continuous along the entire lined pipeline. Each sensor may be a seawater sensor or a variety of different sensors may be employed. At the end of each lined pipe section 1A, 1B, 1C, the corresponding sensor cable 31A, 31B, 31C is communicatively connected to pass-throughs 45A, 45B located in the electrofusion fittings 41A, 41B. These pass-throughs permit communication of data and/or electrical signals between one sensor cable and a subsequent sensor cable to permit transfer of the data and/or signals along the length of the lined pipeline. Terminals are provided on the electrofusion fittings 41A, 41B for connection to respective sensor cables.

Each electrofusion fitting 41A, 41B is provided with an embedded sensor 43A, 43B which in this example are advantageously seawater sensors (although again any type or combination of sensors may be employed) in the proximity of a corresponding girth weld 51A, 51B. Should there be a leak in (or around) the girth weld or a leak in one or more electrofusion welds between the fitting 41A, 41B and respective pipe linings 13A, 13B, 13C the sensors can detect this and communicate this to the monitoring apparatus 35. The sensors 43A, 43B is communicatively connected to the sensor cables via the pass throughs 45A, 45B. If the sensors 43A, 43B are embedded within an insulation portion of the electrofusion fitting—which serves to protect the electrofusion fitting from heat damage during formation of the girth welds 51A, 51B—the sensors will likewise be protected from such heat damage.

While the lined pipeline described with reference to FIG. 4 above employs modified electrofusion fittings, as noted above, any joining method which preserves the continuity of the annulus between the host pipe and the pipe lining across the join may be employed, for example butt fusion welding. The inventive method will continue to benefit from the provision of a continuous annulus as described herein.

Figure 5:
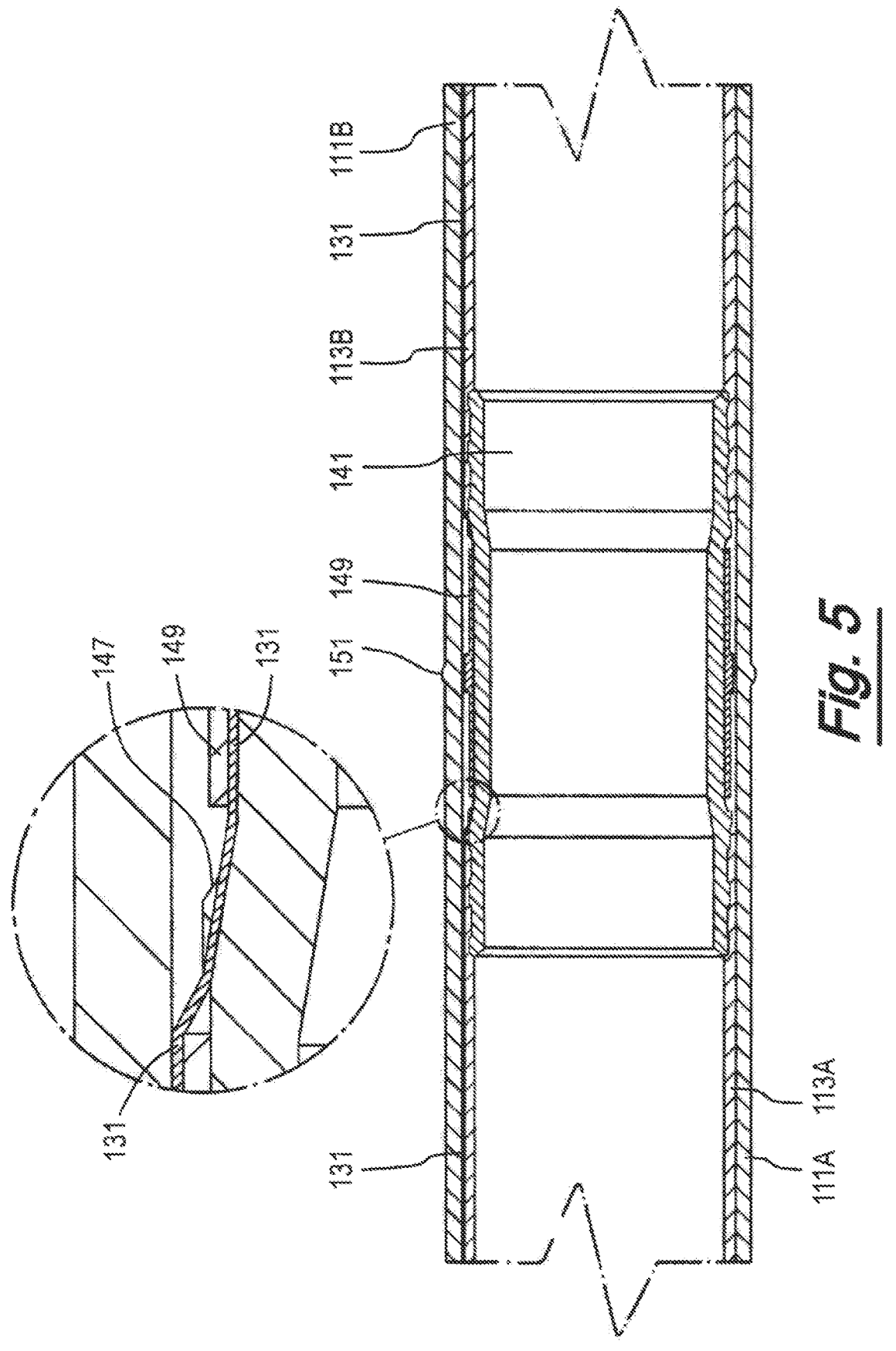
FIG. 5 is a longitudinal cross-sectional schematic view of a portion of a polymer lined pipeline, showing detail of an electrofusion fitting according to an aspect of the invention.

FIG. 5 illustrates an electrofusion fitting 141 which, instead of providing pass-throughs and terminals, simply accommodates a sensor cable 131 which extends between adjacent pipe lengths 111A, 111B. The inset of FIG. 5 shows detail of a shoulder 147 which has been drilled through to permit sensor cable 131 to pass through. The sensor cable 131 is then routed under the insulation 149 which protects the fitting 141 from heat damage when the girth weld 151 is formed. The insulation 149 may therefore also protect the sensor cable 131 from heat damage. Using such an electrofusion fitting 141 enables a sensor cable 131 to bridge girth welds without having to terminate the sensor cable 131.

Note that the insulation 149 is optional and likewise routing the sensor cable under the insulation is also optional as the sensor cable could be provided with heat resistance, for example by applying a heat resistant coating or sheath or choosing a sensor cable which is inherently heat resistant. Furthermore, it will be appreciated that rather than simply passing through a channel through a shoulder or other portion of the fitting 141, a channel may extend substantially through the length of the fitting which would further protect the sensor cable. Alternatively, the fitting could be provided with a longitudinal channel extending along a surface of the fitting which is able to receive and locate the sensor cable. Such a channel may extend under the insulation (if provided).

Note that in an alternative embodiment, it is envisaged that the sensor cable disposed within the lined pipe sections (as described with reference to FIGS. 1 to 3 and FIG. 4 above) may simply serve to allow transmission of measured parameters from sensors disposed within electrofusion fittings; in other words, there need not be sensors disposed within the annulus of the lined pipe sections themselves if sensors are provided in the electrofusion fittings (although it is envisaged that sensors may be provided both in the annulus of the lined pipe sections and in the electrofusion fittings). In such an arrangement, the sensor cables may simply comprise electrical wires or other communication conduits such as an optical fibre.

Figure 6:
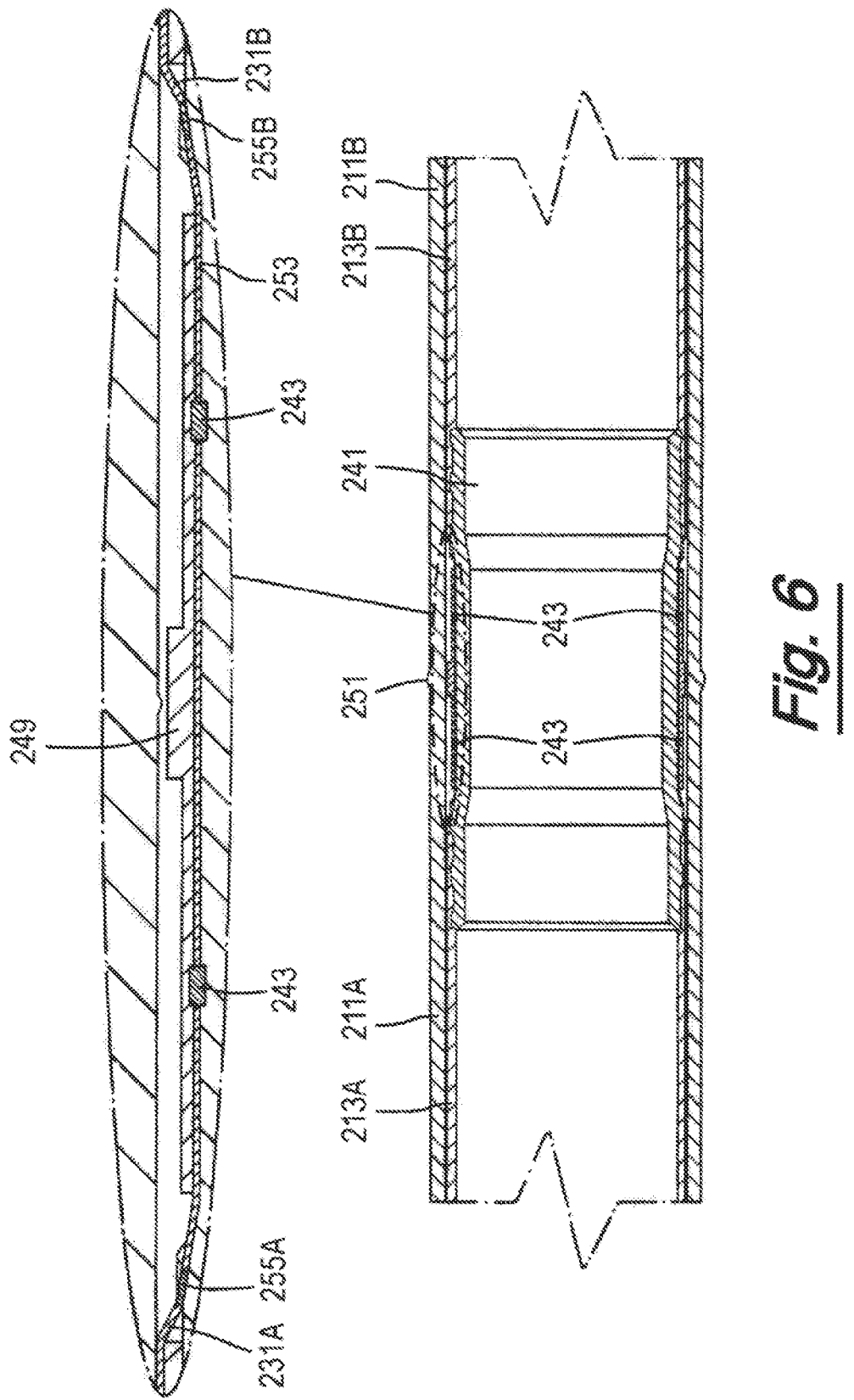
FIG. 6 is a longitudinal cross-sectional schematic view of a portion of a polymer lined pipeline, showing detail of an alternative electrofusion fitting according to an aspect of the invention.

FIG. 6 illustrates an example of such an electrofusion fitting 241, in which sensors 243 are disposed on an outer surface of the electrofusion fitting 241, and terminals 255A, 255B are provided in a surface of the fitting 241 for connection to corresponding sensor cables 231A, 231B. In this example, a pass-through or sensor cable 253 extends between terminals 255A, 255B to allow communication between the terminals 255A, 255B (and hence sensor cables 231A, 231B) along the fitting 241 and also with sensors 243.

Similar to the fitting illustrated in FIG. 5, the sensor cable 253 is protected from heat damage in the vicinity of the girth weld 251 by a portion of insulation 249 provided on the fitting 241. In this embodiment, the sensor cable 253 is routed along a channel which is formed in a surface of the electrofusion fitting 241; the channel also accommodates the sensors 243. It is foreseen that the cable 253 could be embedded in the surface of the fitting 241 with only the sensors protruding or otherwise exposed to the annular space between the fitting 241 and the host pipes 211A, 211B. The sensors 243 are shown as being located under the insulation 249, whereby they are also protected from heat damage, although they may be located anywhere on the surface of the fitting 241.

As noted above, while such an electrofusion fitting might enable monitoring of the annulus without necessitating sensors in the annulus of the lined pipe sections themselves, it is foreseen that sensors may be provided both in the annulus of the lined pipe sections and in the electrofusion fittings. As also noted above, several sensor cables may be deployed in a pipeline and as such an electrofusion fitting according to the invention may be provided with two or more channels, pass-throughs and/or other means of allowing connection across or bridging of a joint between adjacent sections.

In a method of joining sections of lined pipe, an electrofusion fitting such as described with reference to FIG. 4, FIG. 5, FIG. 6, or elsewhere in the present application, is used to join the linings of adjacent sections while enabling the provision of an integrity monitoring system which bridges such joints and may thereby enable a resulting pipeline to be monitored along its entire length.

The electrofusion fitting is received in respective ends of the sections of lined pipe, preferably in recesses formed in the linings, and welds created between the fitting and the linings in a known manner before a girth weld is created between the pipes themselves. Using a modified (or bespoke) electrofusion fitting as described herein permits a sensor cable deployed in the annulus (or annuli) of the lined pipe sections to either extend across (or bridge) the joint, or communicate across the joint to/with a subsequent sensor cable via pass-throughs or sensor cables on or in the fitting itself.

Application of such methods and apparatus as described herein results not only in a lined pipeline of significant length with sensors distributed throughout, but an electrofusion fitting may be shaped and sized so as to maintain a continuous inner diameter along the entire length of the pipeline. The electrofusion fitting may also be shaped and sized so that there is a corresponding continuity provided along the outer diameter of the lining along the entire length of the pipeline and, accordingly, continuity of the annulus along the entire length of the pipeline. This allows the benefits of the invention disclosed herein to be realised with relative ease regardless of the mode of pipe laying or construction selected.

Note that the present invention, in which sensors are disposed within a continuous annulus, also benefits from other advantages of the provision of a continuous annulus. By progressively flooding the lined pipeline, air pockets within the annulus can actually be forced along the entire length of the pipeline by the resultant progressive radial expansion of the liner against the host pipe, thus leaving little or no trapped air in the annulus at all. The invention therefore also provides for a method of laying lined pipeline which actively and successfully removes air pockets which might be trapped in the annulus between the liner and the host pipe (significantly reducing the risk of potential collapse during operational service life) while improving retention of sensors and sensor cables and contact between said sensors and the host pipe and/or lining resulting in further improved monitoring performance.

Lined pipe that has been welded together using conventional fittings which contain barriers to the continuous annulus such as compression rings or welded fitments prevent sensors being distributed and connected along the entire length of a lined pipeline. Such barriers also prevent progressive flooding which can be employed in accordance with the invention to eliminate the risk of air building up and accumulating that would otherwise present a collapse risk to the liner in discrete sections of lined pipe bound by such barriers.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims. For example, where pipe lining methods have been exemplified with reference to the Applicant's Swagelining® pipe lining service, it will be understood that the methods apply equally to pipelines lined using slip lining, folded liner insertion or other similar techniques.

The invention claimed is:

1. An electrofusion fitting for joining a first internal pipe lining of a first section of lined pipe to a second internal pipe lining of a second section of lined pipe, the electrofusion fitting being configured to be received in respective ends of the first and second sections of lined pipe, and to enable a first sensor cable portion disposed between the first internal pipe lining and a first host pipe in the first section of lined pipe to communicate with a second sensor cable portion disposed between the second internal pipe lining and a second host pipe in the second section of lined pipe, the first and second host pipes each being of metal.

2. The electrofusion fitting of claim 1, comprising at least one sensor cable extending from a position towards a first end of the electrofusion fitting to a position towards a second end of the electrofusion fitting.

3. The electrofusion fitting of claim 2, connectable at the first end to the first sensor cable portion, and at the second end to the second sensor cable portion.

4. The electrofusion fitting of claim 3, comprising a terminal at positions towards each end of the sensor cable for attachment to the first and second sensor cable portions.

5. The electrofusion fitting of claim 1, comprising at least one channel extending from a position towards a first end of the electrofusion fitting to a position towards a second end of the electrofusion fitting.

6. The electrofusion fitting of claim 5, wherein the at least one channel is provided on a surface of the electrofusion fitting.

7. The electrofusion fitting of claim 5, wherein the at least one channel extends at least partially through a body of the electrofusion fitting.

8. The electrofusion fitting of claim 5, wherein the at least one channel comprises a bore through a shoulder provided in a body of the electrofusion fitting.

9. The electrofusion fitting of claim 5, wherein the at least one channel extends substantially through a body of the electrofusion fitting.

10. The electrofusion fitting of claim 5, wherein the at least one channel enables a continuous sensor cable to be routed across, through or otherwise bridge the electrofusion fitting, and wherein the continuous sensor cable comprises both the first sensor cable portion and the second sensor cable portion.

11. The electrofusion fitting of claim 1, further comprising insulation to protect the electrofusion fitting from heat damage.

12. The electrofusion fitting of claim 11, wherein the insulation protects the first sensor cable portion and/or the second sensor cable portion from heat damage.

13. The electrofusion fitting of claim 11, wherein the first sensor cable portion, the second sensor cable portion or another sensor cable may be routed or otherwise located between the insulation and a main body of the electrofusion fitting.

14. The electrofusion fitting of claim 1, comprising at least one sensor.

15. The electrofusion fitting of claim 14, wherein the at least one sensor is configured to communicate with the first sensor cable portion and/or the second sensor cable portion.

* * * * *